United States Patent [19]
Teterwak

[11] Patent Number: 5,841,427
[45] Date of Patent: Nov. 24, 1998

[54] METHOD AND APPARATUS FOR CANCELING AN OFFSET SIGNAL IN AN ELECTROSTATIC DIGITIZING TABLET

[75] Inventor: Jerzy A. Teterwak, Colorado Springs, Colo.

[73] Assignee: Symbios, Inc., Fort Collins, Colo.

[21] Appl. No.: 576,894

[22] Filed: Dec. 22, 1995

[51] Int. Cl.⁶ .............................. G08C 21/00; G09G 5/00
[52] U.S. Cl. ...................... 345/173; 345/174; 178/18.05; 178/18.06
[58] Field of Search .................... 345/173, 174, 345/175, 179; 178/18.01, 18.02, 18.03, 18.05, 18.06, 19.01, 19.03

[56] References Cited

U.S. PATENT DOCUMENTS

| | | | |
|---|---|---|---|
| 4,136,291 | 1/1979 | Waldron | 307/308 |
| 4,233,522 | 11/1980 | Grummer et al. | 307/116 |
| 4,290,052 | 9/1981 | Eichelberger et al. | 340/365 |
| 4,293,734 | 10/1981 | Pepper, Jr. | 178/19 |
| 4,444,055 | 4/1984 | Balkanli | 73/708 |
| 4,581,483 | 4/1986 | Ralston | 178/18 |
| 4,636,714 | 1/1987 | Allen | 324/60 |
| 4,707,845 | 11/1987 | Krein et al. | 178/19 |
| 4,737,773 | 4/1988 | Kobayashi | 340/707 |
| 4,859,814 | 8/1989 | Sciacero et al. | 178/19 |
| 4,918,262 | 4/1990 | Flowers et al. | 178/18 |
| 5,008,497 | 4/1991 | Asher | 178/18 |
| 5,116,132 | 5/1992 | Mitchell et al. | 356/350 |
| 5,359,156 | 10/1994 | Chan et al. | 345/173 |
| 5,374,787 | 12/1994 | Miller et al. | 178/18 |
| 5,410,329 | 4/1995 | Tagawa et al. | 345/104 |

FOREIGN PATENT DOCUMENTS

| | | | |
|---|---|---|---|
| 0665508 | 8/1995 | European Pat. Off. | G06K 11/16 |
| 0698858 | 2/1996 | European Pat. Off. | G06K 11/16 |

OTHER PUBLICATIONS

Capacitive Touch Panel Using Uniform Resistive Film; Fujitsu–Scientific & Technical Journal, vol. 22, No. 2; Jun., 1986; pp. 124–131 XP000049078; Yoshikawa et al.

*Primary Examiner*—Vijay Shankar
*Attorney, Agent, or Firm*—Paul J. Maginot; Wayne P. Bailey

[57] ABSTRACT

A method and apparatus for generating an output signal in a digitizer. The method includes the steps of generating a first signal when a user contacts a sensor panel wherein the first signal has a first component and a second component, generating a second signal which is substantially identical to the first component of the first signal, and using the second signal to cancel out the first component of the first signal so as to generate the output signal which is substantially identical to the second component of the first signal.

16 Claims, 3 Drawing Sheets

METHOD AND APPARATUS FOR CANCELING AN OFFSET SIGNAL IN AN ELECTROSTATIC DIGITIZING TABLET

BACKGROUND OF THE INVENTION

The present invention relates generally to digitizers, and more particularly to a method and apparatus for canceling an offset signal in an electrostatic finger-sensitive digitizer.

Electrostatic digitizing panels or digitizers having a resistive layer covered with a non-conductive plate such as glass, are known in the art. When operating in a touch mode, the corners of the resistive layer are typically stimulated with an AC reference signal so that when a finger touches the non-conductive plate, the finger capacitively couples to the resistive layer thereby causing current flow in the corners of the resistive layer. The position of the finger can typically be determined based on a ratio of current flow in each of the corners of the resistive layer.

One problem with the known electrostatic digitizing panels is the presence of parasitic capacitance that couples the digitizer with surrounding metal components of the computer which are usually grounded. This capacitive coupling may be comparable or even stronger than the capacitive coupling with a user's finger when contacting the non-conductive layer.

Thus, in an idle state of the known electrostatic finger-sensitive digitizing tablet (e.g. when a user's finger is not touching the non-conductive layer), an offset current can flow in the resistive layer due only to the loading caused by the parasitic capacitance of the surrounding metal computer components. The offset current is still present in an active state of the digitizing tablet when a user's finger is touching the non-conductive layer. The offset current flow may disadvantageously add to the current flow attributed to the user's finger thus potentially causing an error when subsequently determining the position coordinates of the user's finger relative to the digitizing panel.

What is needed therefore is an electrostatic finger-sensitive digitizer that compensates for, or cancels an offset signal generated as a result of stray capacitive coupling between the sensor panel and other components that form the computer.

SUMMARY OF THE INVENTION

In accordance with one aspect of the present invention, there is provided a method for generating an output signal in a digitizer. The method includes the steps of generating a first signal when a user contacts a sensor panel wherein the first signal has a first component and a second component, generating a second signal which is substantially identical to the first component of the first signal, and using the second signal to cancel out the first component of the first signal so as to generate the output signal which is substantially identical to the second component of the first signal.

Pursuant to another aspect of the present invention, there is provided a digitizer having a sensor panel for providing a first signal on a first output line when a user contacts the sensor panel. The first signal includes a first component and a second component. The digitizer also includes an impedance network for providing a second signal on a second output line which is substantially identical to the first component of the first signal, and a compensation circuit which is connected to the first and second output lines for (1) using the second signal to cancel out the first component of the first signal, and (2) generating an output signal which is substantially identical to the second component of the first signal.

Pursuant to yet another aspect of the present invention, there is provided a digitizer including a sensor panel for providing a first sensor panel signal and a second sensor panel signal when a user contacts the sensor panel, wherein (1) the first sensor panel signal has a first component and a second component, and (2) the second sensor panel signal has a third component and a fourth component. The digitizer also includes a first impedance network for providing a first impedance signal which is substantially identical to the first component of the first sensor panel signal, and a second impedance network for providing a second impedance signal which is substantially identical to the third component of the second sensor panel signal. In addition, the digitizer includes a first compensation circuit which receives the first sensor panel signal and the first impedance signal for (1) using the first impedance signal to cancel out the first component of the first sensor panel signal, and (2) generating a first output signal which is substantially identical to the second component of the first sensor panel signal; and includes a second compensation circuit which receives the second sensor panel signal and the second impedance signal for (1) using the second impedance signal to cancel out the third component of the second sensor panel signal, and (2) generating a second output signal which is substantially identical to the fourth component of the second sensor panel signal.

It is therefore an object of the present invention to provide a new and useful digitizer.

It is another object of the present invention to provide an improved digitizer.

It is also an object of the present invention to provide a new and useful method for generating an output signal in a digitizer.

It is also an object of the present invention to provide an improved method for generating an output signal in a digitizer.

It is yet another object of the present invention to provide a digitizer which cancels an offset signal resulting from parasitic capacitance.

It is still yet another object of the present invention to provide a digitizer which facilitates accurate finger position determination relative to a sensor panel in a touch mode.

The above and other objects, features, and advantages of the present invention will become apparent from the following description and the attached drawings.

DETAILED DESCRIPTION OF THE PREFERRED EMBODIMENT

Figure 1:
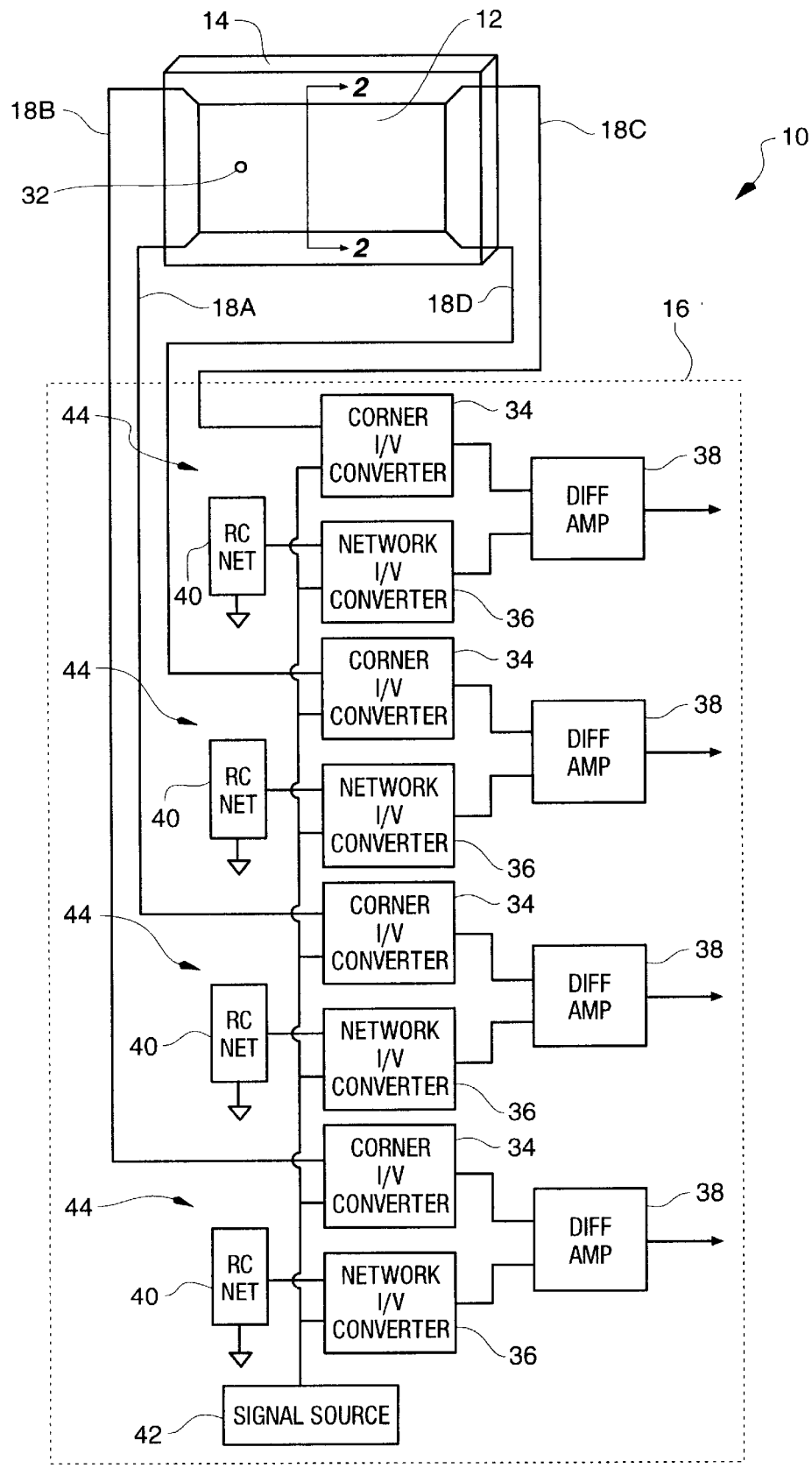
FIG. 1 is a block diagram of a digitizer which incorporates the features of the present invention therein, with the digitizer including an offset signal cancellation circuit operatively connected to a sensor panel of a computer.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a digitizer apparatus 10 for a computer (not shown) which includes an electrostatic sensor panel 12 secured to a housing 14, such as a notebook computer housing, and an offset signal cancellation circuit 16. The electrostatic sensor panel 12 is operatively connected to the offset signal cancellation circuit 16 through a number of corner channels or wires 18 as described further below. In the embodiment being described, there are four corner wires 18a–18d connecting the electrostatic sensor panel 12 to the offset signal cancellation circuit 16.

Figure 2:
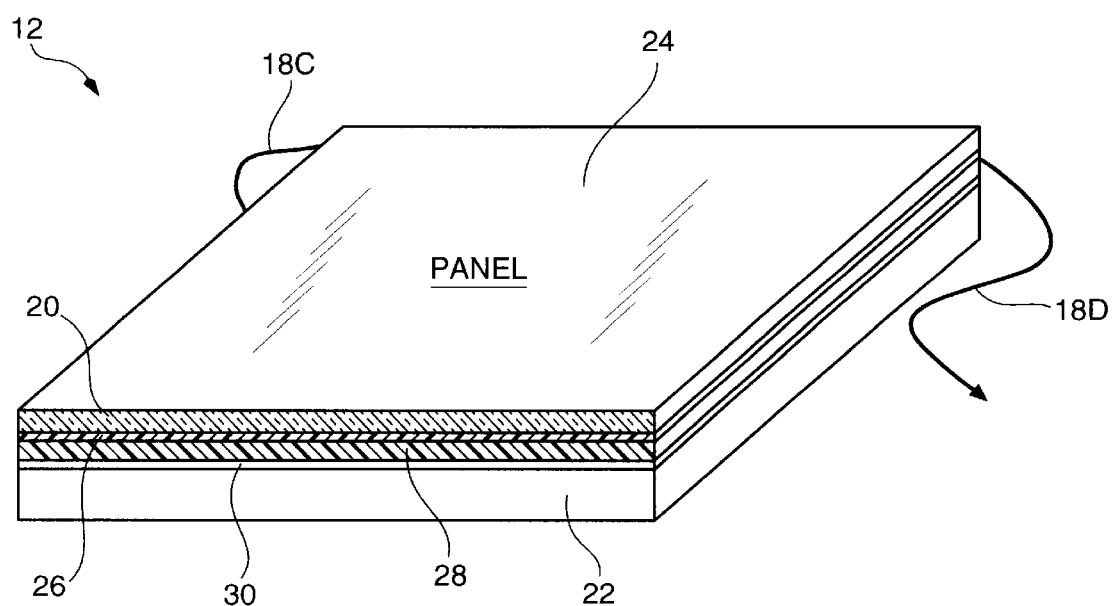
FIG. 2 is a perspective view of the sensor panel taken along the lines 2—2 in FIG. 1.

The electrostatic sensor panel 12 may include several layers of material as shown in FIG. 2. A glass layer 20 protects a display screen 22 such as an LCD (Liquid Crystal Display) screen which is disposed below the glass layer 20. An upper surface 24 of the glass layer 20 defines a writetouch surface while a lower surface of the glass layer 20 has an active sensor material 26 applied thereto. In the embodiment being described, the active sensor material 26 is a thin layer or coating of transparent indium-tin-oxide (ITO).

A polyester spall shield 28 may be attached to the underside of the active ITO layer 26 to prevent the glass surface 20 from shattering if ever broken. An additional ITO shield layer (not shown) may be deposited on the lower side of the polyester spall shield 28. The additional ITO shield layer reduces the noise coupling between the display screen 22 and the active ITO layer 26. The capacitive coupling between the active ITO layer 26 and the additional ITO shield layer may be significantly reduced by connecting the additional ITO shield layer to the same AC voltage or reference signal that stimulates the corners of the active ITO layer 26 as described further below. An air gap 30 separates the lower surface of the spall shield 28 from an upper surface of the LCD screen 22.

Each corner wire 18a–18d is electrically connected to a respective corner of the active ITO layer 26 for carrying current flow generated as a result of a user's finger touching the glass layer 24. When the active ITO Layer 26 is biased with an AC voltage or reference signal, a touching finger adds an increased capacitive load to the active ITO layer 26 that results in an additional current flow through each of the corners of the ITO layer 26.

More specifically, the active ITO layer 26 is slightly resistive and divides the finger-induced current between the four corner wires 18a–18d. The magnitude of current flowing in each of the corner wires 18a–18d is proportional to the conductivity of the active ITO layer 26 between each individual corner of the active ITO layer 26 and the user's finger at, for example, a finger position 32 on the glass layer 20 as shown in FIG. 1.

Thus, the touch of a user's finger may be detected by measuring the additional current required to feed the added capacitive load on the sensor panel 12. The difference in currents flowing in each of the corner wires 18a–18d is indicative of the extra charge that is required in the active ITO layer 26 directly under the finger.

Referring again to FIG. 1, the offset signal cancellation circuit 16 includes a number of corner current-to-voltage (I/V) converters 34, compensation or network current-to-voltage converters 36, differential amplifiers 38, impedance networks 40 such as RC (resistor-capacitor) networks, and a reference signal source 42. In particular, each corner I/V converter 34 is paired with a network I/V converter 36, and a differential amplifier 38 to form a compensation circuit 44 for each of the corner wires 18a–18d as shown in FIG. 3.

Each compensation circuit 44 has an RC network 40 associated therewith.

As shown in FIG. 1, the corner I/V converters 34 each have two inputs, a first input from a respective corner wire 18a–18d, and a second input from the reference signal source 42. The network I/V converters 36 each have two inputs, a first input from a respective RC network 40 and a second input from the reference signal source 42. The RC networks 40 are each connected to a reference potential such as the system ground potential. The differential amplifiers 38 each have two inputs. A first input from a corner I/V converter 34 and a second input from a network I/V converter 36.

Figure 3:
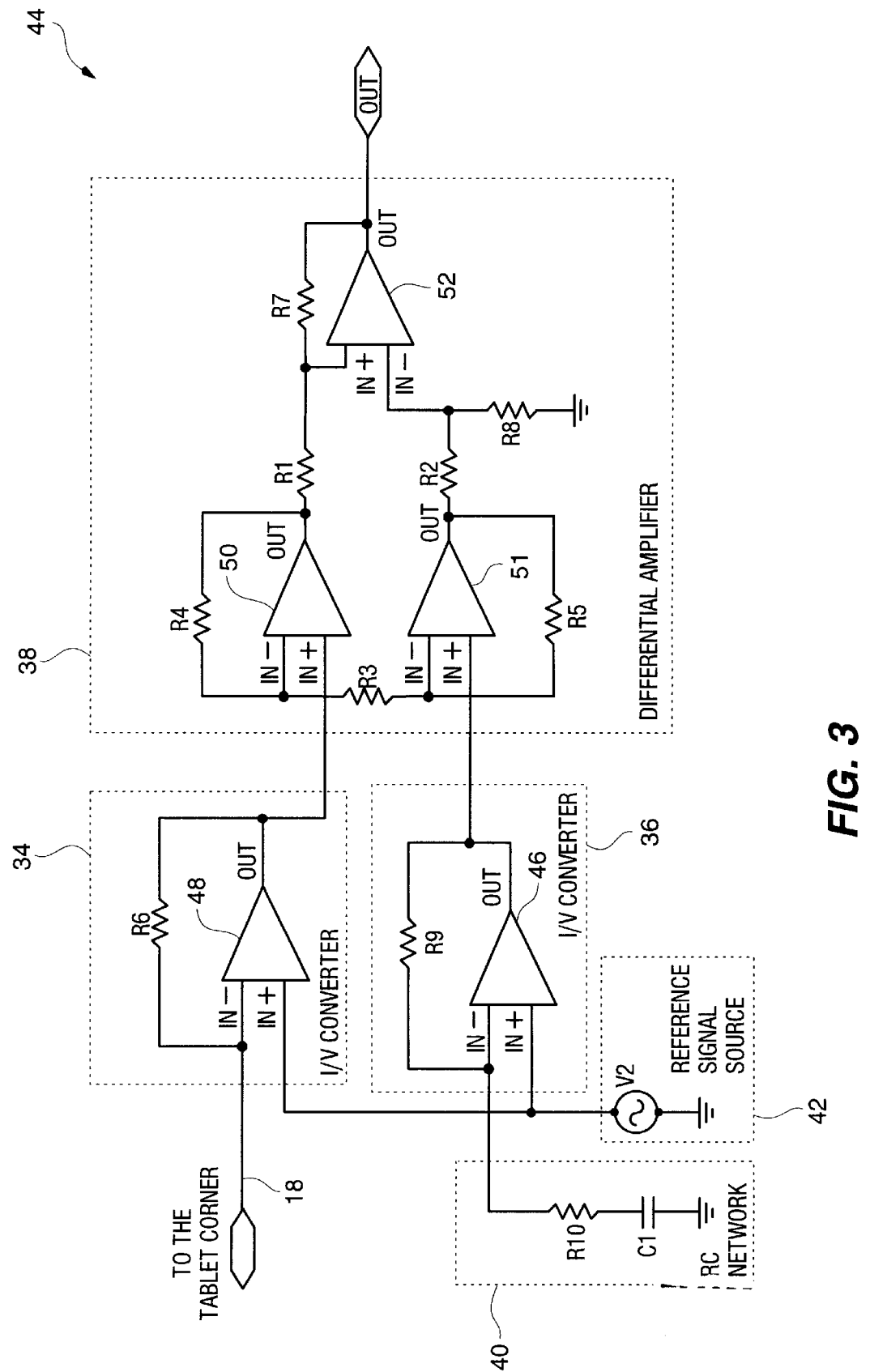
FIG. 3 is a schematic diagram of a channel circuit portion of the offset signal cancellation circuit shown in FIG. 1.

Referring now to FIG. 3, there is shown a schematic diagram for the channel circuit portion 44 of the offset signal cancellation circuit 16 shown in FIG. 1. The RC network 40 is designed to have a complex impedance that substantially matches the complex impedance of the active ITO layer 26 as seen from the corresponding corner of the active ITO layer 26 to the system ground potential. That is, the complex impedance of the RC network 40 comprises a resistance (R10) and a capacitance (C1) that are matched for the particular operating frequency of the digitizer apparatus 10.

The corner I/V converter 34 includes an operational amplifier 48 also having a first or inverting input (IN−), a second or non-inverting input (IN+) and an output (OUT). The operational amplifier 48 is similarly connected in a closed-loop negative feedback configuration wherein a resistor R6 is coupled between the output (OUT) and the inverting input (IN−) of the operational amplifier 48. A corner wire 18 is connected to the inverting input (IN−) of the operational amplifier 48, and the reference signal source 42 couples the AC reference signal to the non-inverting input (IN+) of the operational amplifier 48.

The network I/V converter 36 includes an operational amplifier 46 having a first or inverting input (IN−), a second or non-inverting input (IN+) and an output (OUT). The operational amplifier 46 is connected in a closed-loop negative feedback configuration wherein a resistor R9 is coupled between the output (OUT) and the inverting input (IN−) of the operational amplifier 46. The output of the RC network 40 is applied to the inverting input (IN−) of the operational amplifier 46. The reference signal source 42 couples an AC reference signal to the non-inverting input (IN+) of the operational amplifier 46.

The I/V converter 34, 36 each have two functions. The I/V converter 34 (1) provides an AC signal for stimulating the active ITO sensor layer 26, and (2) converts the current flowing through the respective corner of the active ITO layer 26 to a voltage signal at the output (OUT) of the I/V converter 34. The I/V converter 36 (1) provides an AC signal for stimulating the RC network 40, and (2) converts the current flowing through the RC network 40 to a voltage signal at the output (OUT) of the I/V converter 36.

Since the operational amplifiers 46, 48 are connected in a closed loop negative feedback configuration, the voltage difference between the respective inverting inputs (IN−) and the non-inverting inputs (IN+) is substantially equal to zero. Therefore, the AC signals present at the respective inverting inputs (IN−) are substantially equal to the reference AC signal applied to the non-inverting inputs (IN+) from the reference signal source 42. That is, the AC signals that stimulate the corners of the active ITO layer 26 are substantially equal to the reference AC signal applied to the non-inverting inputs (IN+) from the reference signal source 42. Likewise, the AC signals that stimulate the RC networks 40 are substantially equal to the reference AC signal applied to the non-inverting inputs (IN+) from the reference signal source 42.

The AC signals that stimulate the corners of the active ITO layer 26 and the RC networks 40 cause current to flow through the corners of the active ITO layer 26 and the RC networks 40, respectively. Since the inverting inputs (IN−) represent substantially infinite impedance, the entire current flows through the respective feedback resistors R6, R9 thus creating a voltage drop across it. The respective voltage drops are equal to (i)(R), where i is the input current and R is the value of the respective resistor R6, R9.

The voltage at the output (OUT) of the respective I/V converters 34, 36 is equal to the sum of the voltage at the inverting inputs (IN−) of the operational amplifiers 46, 48 and the voltage drop across the feedback resistors R6, R9, respectively. Therefore, the output voltage ($V_{out}$) is equal to $V_{ref}$+(i)(R); where Vref is the AC reference signal supplied from the reference signal source 42. Thus, it should be appreciated that the output voltage ($V_{out}$) for each I/V converter 34, 36 is equal to a constant signal source ($V_{ref}$) plus the component proportional to the respective input current.

The differential amplifier 38 has a conventional configuration including operational amplifiers 50, 51 and 52. Operational amplifiers 50 and 51 are connected in a closed-loop negative feedback configuration with the output (OUT) of the operational amplifier 48 connected to the non-inverting input (IN+) of the operational amplifier 50, and the output (OUT) of the operational amplifier 46 connected to the non-inverting input (IN+) of the operational amplifier 51.

The channel circuit 44 has two modes or states of operation, an idle mode when a user's finger is not contacting the glass layer 20, and an active mode when a user's finger is contacting the glass layer 20. In the idle mode, the signal generated at the output (OUT) of the corner I/V converter 34 is substantially identical to a compensation signal generated at the output (OUT) of the network I/V converter 36.

That is, the signal generated at the output (OUT) of the corner I/V converter 34 represents the offset current flowing in the corner wires 18a–18d due only to the parasitic capacitance from the metal components surrounding the sensor panel 12. The signal generated at the output (OUT) of the network I/V converter 36 represents a compensation signal which is substantially identical to the signal generated at the output of the corner I/V converter 34 because the complex impedance of the active ITO layer 26 is substantially identical to the complex impedance of the RC network 40.

When the substantially identical signals from the output (OUT) of the corner I/V converter 34 and the output (OUT) of the network I/V converter 36 are applied to the inputs of the differential amplifier 38, both output signals are canceled due the common mode rejection characteristics of the differential amplifier 38. Thus, no output signal is generated at the output (OUT) of the differential amplifier 38 and the offset signal is at least substantially reduced or eliminated.

In sum, the complex impedance of the compensating RC network 40 is substantially identical to the complex impedance of the corresponding corner of the active ITO layer 26. Therefore, the output voltages from the I/V converters 34, 36 are substantially the same. Since the same voltage is applied to the inverting (IN−) and non-inverting (IN+) inputs of the differential amplifier 38, the output voltage (OUT) of the differential amplifier 38 is zero, thus canceling the offset signal on corner wire 18 caused by the stray capacitive coupling between the sensor panel 12 and the various metal components of the computer near or around the sensor panel 12.

The channel circuit 44 operates in the active mode when a user's finger is approaching and/or touching the glass layer 20 of the sensor panel 12. In the active mode, the current flow through the corner wires 18a–18d increases due to summing of the offset current flow with the current flow resulting from the capacitive coupling of the user's finger to the active ITO layer 26. The current flow through the RC network remains substantially unchanged in the active mode.

Thus, the signal generated at the output (OUT) of the corner I/V converter 34 represents the summation of current flow through the respective corner wire 18 which is greater than the compensation signal generated at the output (OUT) of the network I/V converter 36. The difference between the output (OUT) of the corner I/V converter 34 and the output (OUT) of the network I/V converter 36 represents the current flow attributed solely to the capacitive coupling effects of the user's finger touching the glass layer 20.

When the signals from the output (OUT) of the corner I/V converter 34 and the output (OUT) of the network I/V converter 36 are applied to the inputs of the differential amplifier 38, the components of the signals representing the parasitic capacitance of the metal components and of the RC network 40 cancel each other out just like during the idle state of the channel circuit 44.

The difference component between the output signals from the I/V converters 34, 36 is amplified in the differential amplifier 38 resulting in an output signal substantially solely indicative of the user's finger approaching/touching the sensor panel 12. It should be appreciated that the output of the differential amplifier 38 may be applied to additional digitizer circuitry (not shown) for determining the position of user's finger relative to the sensor panel 12.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for generating an output signal in a digitizer, comprising the steps of:
    generating a first signal when a user contacts a sensor panel, said first signal having a first component and a second component;
    generating a second signal which is substantially identical to said first component of said first signal; and
    using said second signal to cancel out said first component of said first signal so as to generate the output signal which is substantially identical to said second component of said first signal.

2. The method claimed in claim 1, wherein the first component is indicative of a capacitance coupling to an object proximate the sensor panel, and the second component is indicative of a capacitive loading of the user contacting the sensor panel.

3. The method claimed in claim 1, wherein said using step includes the step of:
    subtracting said second signal from said first signal so as to cancel said first component of said first signal.

4. The method claimed in claim 1, wherein said second signal generating step includes the step of:

providing an RC circuit which generates said second signal.

5. The method claimed in claim 4, wherein said using step includes the steps of:
   providing a first I/V converter for receiving said first signal;
   providing a second I/V converter for receiving said second signal; and
   providing a differential amplifier which is connected to said first and second I/V converters for generating said output signal.

6. A digitizer, comprising:
   a sensor panel for providing a first signal on a first output line when a user contacts said sensor panel, said first signal having a first component and a second component;
   an impedance network for providing a second signal on a second output line which is substantially identical to said first component of said first signal; and
   a compensation circuit, connected to said first and second output lines, for (1) using said second signal to cancel out said first component of said first signal, and (2) generating an output signal which is substantially identical to said second component of said first signal.

7. The digitizer claimed in claim 6, wherein said first component is indicative of a capacitive coupling to an object proximate said sensor panel, and said second component is indicative of a capacitive loading of the user contacting said sensor panel.

8. The digitizer claimed in claim 6, wherein said sensor panel includes a resistive layer, and said compensation circuit is electrically connected to a corner of said resistive layer.

9. The digitizer claimed in claim 8, wherein said impedance network includes a resistor and a capacitor connected together so as to substantially match an impedance at said corner of said resistive layer.

10. The digitizer claimed in claim 8, wherein said compensation circuit includes a first I/V converter connected to said first output line, a second I/V converter connected to said second output line, and a differential amplifier connected to said first and second I/V converters for generating said output signal.

11. A digitizer, comprising:
    a sensor panel for providing a first sensor panel signal and a second sensor panel signal when a user contacts said sensor panel, wherein (1) said first sensor panel signal has a first component and a second component, and (2) said second sensor panel signal has a third component and a fourth component;
    a first impedance network for providing a first impedance signal which is substantially identical to said first component of said first sensor panel signal;
    a second impedance network for providing a second impedance signal which is substantially identical to said third component of said second sensor panel signal;
    a first compensation circuit, which receives said first sensor panel signal and said first impedance signal, for (1) using said first impedance signal to cancel out said first component of said first sensor panel signal, and (2) generating a first output signal which is substantially identical to said second component of said first sensor panel signal; and
    a second compensation circuit, which receives said second sensor panel signal and said second impedance signal, for (1) using said second impedance signal to cancel out said third component of said second sensor panel signal, and (2) generating a second output signal which is substantially identical to said fourth component of said second sensor panel signal.

12. The digitizer claimed in claim 11, wherein:
    the first component of the first sensor panel signal, and the third component of the second sensor panel signal are both indicative of capacitive coupling to an object proximate said sensor panel, and
    the second component of the first sensor panel signal, and the fourth component of the second sensor panel signal are both indicative of capacitive coupling to the user.

13. The digitizer claimed in claim 11, wherein:
    said sensor panel includes a resistive layer,
    said first compensation circuit is electrically connected to a first corner of said resistive layer, and
    said second compensation circuit is electrically connected to a second corner of said resistive layer.

14. The digitizer claimed in claim 13, wherein:
    said first impedance network includes a first resistor and a first capacitor connected together so as to substantially match a first impedance at the first corner of said resistive layer, and
    said second impedance network includes a second resistor and a second capacitor connected together so as to substantially match a second impedance at the second corner of said resistive layer.

15. The digitizer claimed in claim 13, wherein said first compensation network includes:
    a first I/V converter connected to said first corner of said resistive layer;
    a second I/V converter connected to said first impedance network, and
    a first differential amplifier connected to said first and second I/V converters for generating the first output signal.

16. The digitizer claimed in claim 15, wherein said second compensation network includes:
    a third I/V converter connected to said second corner of said resistive layer;
    a fourth I/V converter connected to said second impedance network, and
    a second differential amplifier connected to said third and fourth I/V converters for generating the second output signal.

* * * * *